United States Patent [19]

Odot

[11] Patent Number: 5,176,230

[45] Date of Patent: Jan. 5, 1993

[54] CARBON FRICTION STRIP WITH A DAMAGE DETECTION FACILITY

[75] Inventor: Patrick Odot, Pezenas, France

[73] Assignee: Le Carbone-Lorraine, Courbevoie, France

[21] Appl. No.: 715,764

[22] Filed: Jun. 14, 1991

[30] Foreign Application Priority Data

Jun. 20, 1990 [FR] France ............................ 90 07974

[51] Int. Cl.$^5$ .............................................. B60L 5/08
[52] U.S. Cl. ...................................... 191/87; 191/59.1
[58] Field of Search ................... 191/45 R, 47, 49, 55, 191/59, 59.1, 85-94

[56] References Cited

U.S. PATENT DOCUMENTS 3,394,365 7/1968 Nealis ............................... 191/87 X
4,578,546 3/1986 Ferguson ........................ 191/59.1 X

FOREIGN PATENT DOCUMENTS 000980 3/1979 European Pat. Off. ............ 191/59.1
8912560 12/1989 European Pat. Off. ............ 191/45 R
3905962 4/1990 Fed. Rep. of Germany ........ 191/87
1374972 11/1974 United Kingdom .

Primary Examiner—David A. Bucci
Assistant Examiner—Scott L. Lowe
Attorney, Agent, or Firm—Dennison, Meserole, Pollack & Scheiner

[57] ABSTRACT

The invention relates to a friction strip serving for the transfer of electrical energy to rolling stock and comprising a damage detection device. The friction strip consists of a wearing strip (2) of carbon based material comprising a groove (3) on its face which is in contact with the stirrup member (5) and a tightly sealed tube (4) placed in the groove is connected to the detection device. The material constituting the tube and the material constituting the wearing strip are selected to have closely related mechanical and thermo-mechanical characteristics; this is achieved with a tightly sealed tube of carbon based material. The invention also relates to the method of producing the friction strip.

10 Claims, 3 Drawing Sheets

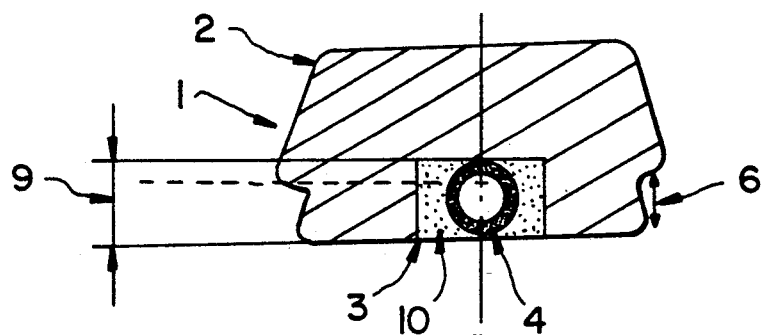
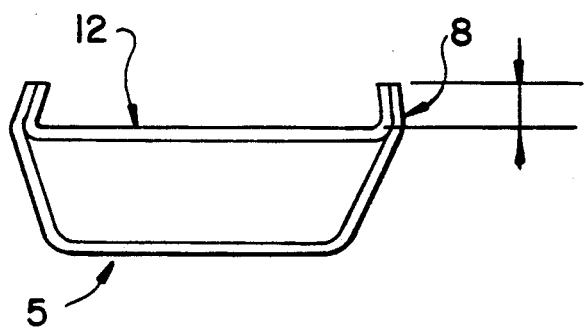
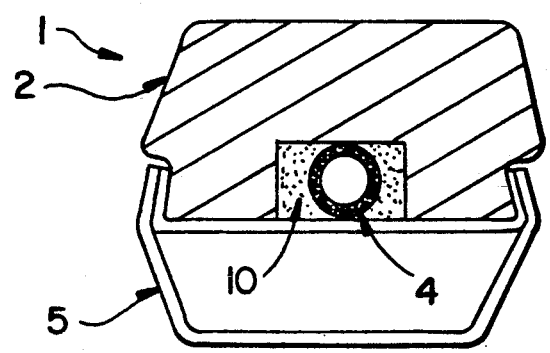

CARBON FRICTION STRIP WITH A DAMAGE DETECTION FACILITY

FIELD OF THE INVENTION

The invention relates to a carbon friction strip which includes a damage detection facility. The friction strip is used for transferring electrical energy between a fixed energy distribution means, such as a wire, and an energy consuming movable appliance, such as an underground train or traction vehicle.

THE PRIOR ART

British Patent GB 1 374 972 describes a carbon friction strip comprising a damage detection device. According to this device, the friction strip is provided with a tubular receptacle containing a fluid so that in the event of excessive wear, or in the event of breakage of the friction strip, the tubular receptacle is ruptured, the escape of fluid is detected, and the pantograph which carries the friction strip is retracted.

An example of friction strip (1) is shown diagrammatically in cross-section in FIG. 6. A groove (3) is disposed over the entire length of the wearing strip (2), on the stirrup side (5), in which the tube (4) supplied with fluid is secured by adhesion. According to this patent, the tube (4) may be of silicone rubber, or of other materials, particularly plastics materials such as PTFE, which are capable of withstanding an operating temperature of, for example, 200° C. According to another arrangement, the tubular receptacle may be constituted by the groove itself, the open surface of which is rendered leak-proof by means of an adhesive product such as a synthetic rubber.

This patent has been the object of an improvement described in U.S. Pat. No. 4,578,546 which corresponds to European Patent No. EP 0 078 159. According to the initial British Patent GB 1 374 972, rupture of the tubular receptacle results from the rupturing or excessive wear on the wearing strip. The improvement provides a tubular expansible receptacle containing a pressurized fluid which is thus sensitive to faults, faults in construction, assembly, or faults such as cracks which originate from and are propagated prior to there being a rupture. The tubular receptacle has a thin wall of silicone rubber which will burst under the interior pressure as soon as this thin wall is no longer supported due to the wearing strip becoming too thin or due to the existence or appearance of a fault in the wearing strip.

STATEMENT OF THE PROBLEM

Although the prior art clearly poses the problem of detecting excessive wear and tear or damage to wearing strips, on the other hand, the solutions in the prior art do not prove to be entirely satisfactory.

Indeed, the Patent EP 078 159 stipulates the limits of the initial invention described in GB 1 374 972. Detection occurs only after rupture or excessive wear and tear of the friction strip, that is to say, with a risk of damage to the pantograph and the overhead contact line.

On the other hand, the Patent EP 0 78 159, which sets out to improve the fault detection sensitivity, proposes a method which does not provide complete satisfaction because detection occurs only after the moment when the tubular receptacle of flexible elastomer is no longer being supported. Further, there are various kinds of damage to the friction strip which are likely not to be detected by this method since they do not necessarily produce an absence of local support at the level of the tubular receptacle. Thus, for example, there may occure the appearance of fissures on the friction strip following a thermal or physical shock, with no significant change in the support of the tubular receptacle to cause rupture and therefore damage is not detected. This is the reason why the applicant has sought a better solution to this problem.

SUMMARY OF THE INVENTION

In order to resolve the problem posed, the applicant has perfected a friction strip (1) which is used for the transfer of electrical energy to rolling stock, constituted by a wearing strip (2) of carbon based electrically conductive material, comprising a device for detecting damage to the wearing strip and on the face of the wearing strip (2) which is in contact with a stirrup member (5) serving as a support, a groove (3) over substantially the entire length of the wearing strip (2) on which there is placed a leak-proof tube (4) containing a pressurized fluid serving as a detector. Communicating with another part of the detecting device, the friction strip is characterized in that the material constituting the tube (4) displays mechanical characteristics, particularly mechanical strength, resilience and thermo-mechanical (expansion coefficient) which comes close to those of the material constituting the wearing strip (2). The depth (9) of the groove (3) is selected to be greater than the height of the jaws (8) of the stirrup member (5) so that the tube (4) will timely detect wear and tear before the limit of use of the wearing strip (2) is reached. The tube (4) and the wearing strip (2) are rendered rigid by means which does not oppose the propagation of the damage from the wearing strip (2) to the tube (4).

The term "characteristics which come close" is intended to imply characteristics, the numerical values of which differ by not more than 25%.

The term "damage" is intended mainly to mean fissures which may appear on the wearing strip as the result of any type of stress, particularly mechanical and thermal shocks.

Having tested tubes made of different materials and having employed different methods of assembly of the tubes and the wearing strips, the applicant has discovered a solution to the problem posed which is in contrast with the solutions hitherto advocated. Indeed, they have observed that any defects in the friction strip are transmitted to the detector tube (4) more readily when the tube has mechanical properties (mechanical strength and resilience mainly) and thermo-mechanical properties which come close to those of the wearing strip (2) and even more readily if the junction between the detector tube and the friction strip does not oppose propagation of damage from the wearing strip to the detector tube.

For example, the applicant avoids the use of all impact tubes consisting of plastic material, particularly those of the prior art and also those of metallic alloy because they lack sensitivity to damage.

In practice, it is advantageous to use materials of the same chemical family in order to obtain the closely related properties. This correspondence of properties can also be achieved with other chemical families so that tubes of a material such as special glasses or special ceramic materials are not excluded from the field of the invention.

Preferably, the tube (4) is carbon based and belongs to the same chemical family as the wearing strip (2). It must be able to withstand a pressure of at least one MPa (10 bars), this pressure being generally that of the compressed air on a locomotive.

BRIEF DESCRIPTION OF THE DRAWINGS

FIG. 1 shows a cross-section through a friction strip according to the invention.

FIG. 2 shows a cross-section through a stirrup member (5) adapted to the friction strip in FIG. 1.

FIG. 3 shows a cross-section through the friction strip in FIG. 1, mounted on the stirrup member in FIG. 2.

FIG. 4 also shows the overhead contact wire (7).

DETAILED DESCRIPTION OF THE PREFERRED EMBODIMENT

According to the invention, the composition of carbon chosen for the tube (4) has a resistance to wear which is at most equal to that of the composition of carbon chosen for the wearing strip (2). Indeed, it is important that the tube should wear by friction at least as easily as the wearing strip so that it is capable to detect damage to the wearing strip before the safe operating limits are reached.

The basic materials constituting the tube and the wearing strip are known per se. Typically, they are obtained as follows:

Various cokes are carefully crushed to obtain powders, the granulation of which varies according to the greater or lesser density required.

These powders are then mixed with a binder, generally of the pitch or compounded clay type, and are stored in the form of precompressed cylinders. These cylinders are then introduced into a press equipped with various dies which make it possible to obtain different profiles, for example of the "wearing strip" type or of the "tube" type. Of course, it is possible to introduce variations into these procedures, for example by continuously carrying out the mixing, the blending of the crushed coke and pitch, the extrusion of the resultant pulp through a suitably profiled die. The profiled shapes are then arranged in firing ovens where they are fired in a neutral atmosphere. At this stage, or subsequently, it is possible to carry out a firing stage which includes a graphitation phase.

Thus, solid profiled sections of fired carbonated material are obtained which are slightly porous due to distillation of part of the binder. These fired profiled sections are then able to undergo various treatments known per se such as impregnation with resin, metallic impregnation, treatments intended either to reduce the porosity, which is essential in the case of the tube (4), or to enhance the mechanical characteristics or electrical properties, or in order to favor slip in order to ensure a low weight of wear due to friction, or even to render the friction strip impermeable so that it is insensitive to water or dampness.

Figure 5:
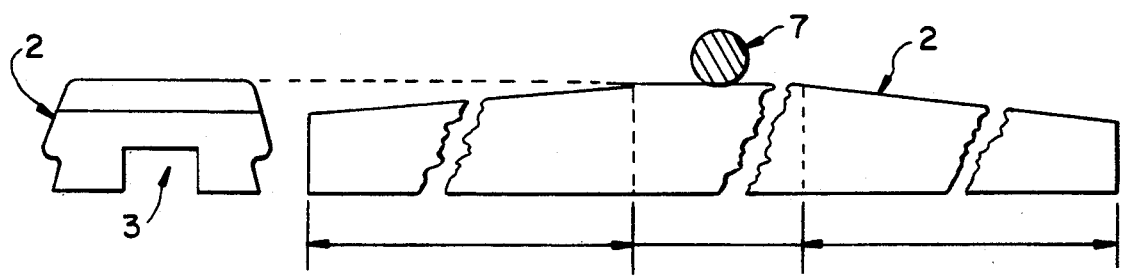
FIG. 5 shows a cross-section and a longitudinal section through a wearing strip showing the three-face wearing surface of the wearing strip with a cross-section of the overhead contact wire (7).
Figure 6:
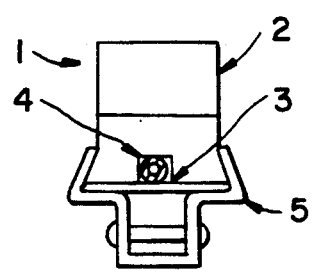
FIG. 6 shows a cross-section through a friction strip and its stirrup member according to the prior art.

The crude profiled sections obtained after firing and various treatments are cut to length, machined and prepared for final assembly of the tube and of the wearing strip. The crude profiled sections corresponding to the wearing strip may, at this stage, be bars of any cross-section, or they may also be bars which already have some of their final dimensions and which may, for instance, have a cross-section, such as in FIG. 1, with the grooves (3) and lateral restrictions (6) for fixing the friction strip on the stirrup member (5). Machining of the wearing strip makes it possible to achieve the final dimensions of the friction strip and to carry out what has not yet been done at the profiled section stage, such as the longitudinal profile as shown in FIG. 5. Indeed, the surface of the friction strip which is in contact with the electrical energy distributor element, often an overhead contact wire (7) in the case of rail transport, generally has a friction surface with three faces with a central plane parallel with the base of the friction strip and two slightly inclined lateral faces; it is at the level of the central plane that the transfer of electrical energy is essentially performed and it is therefore at this level that the friction strip has its maximum thickness. However, the friction strip is not necessarily constituted by faces. It may have a rounded shape, for example, that of a flattened semi-ellipse. The wearing strip may be constituted of several parts which are connected by bevelled edges and which are assembled by any known means, for example, by having their facing surfaces glued. Indeed, certain treatments, for example, an impregnation of carbonated material by a liquid metal, are so far only possible over short lengths of profiled sections which may be less than that of a wearing strip. It is therefore necessary sometimes to treat parts of wearing strips and then to assemble them.

According to the invention, the groove (3) is selected to be of a height which is at least equal to the height of the restriction (6), which is therefore also the height of the jaw (8) of the stirrup member (5) so that when the wearing strip is worn, the wire (7) reaches the groove (3) and its associated tube (4) and triggers the wear signal before the top end of the generally metallic stirrup member is reached, which might result in damage to the electrical energy distribution network, for example, the overhead contact wire (7).

Figure 4:
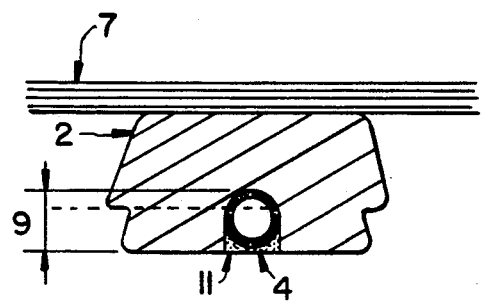
FIG. 4 shows a cross-section through a friction strip with a flush mounted tube and maintained by a glue seal (11) in the bottom of the groove, the cross-section of which is partly semi-circular.

The actual shape of the groove is not in itself critical and is often related to the shape of the tube; it may be of rectangular cross-section, as shown in FIG. 1, or its cross-section may have a semi-circular portion, as shown in FIG. 4, or a square, triangular, semi-elliptical or other cross-section.

The relative geometry of the groove and of the tube may allow either a narrow contact between groove and tube, such as for example shown in FIG. 4, or there may be a more limited contact, as shown for example in FIG. 3.

Assembly of the tube (4) and of the wearing strip (2) by fixing the tube in the groove (3) may be accomplished by any known means. However, the two preferred embodiments of tube and wearing strip assembly according to the invention are either to have the tube fitting flush in the groove, as shown for example in FIG. 4, or the tube may be glued into the groove, or there may be a combination of both methods.

Flush fitment of the tube (4) in the groove (3) is possible according to the invention for various closely related cross-sections of tubes and grooves. Thus, it is possible to have a tube of square cross-section fitting into a groove, the cross-section of which is closely related so that there is a very large area of contact between the tube, the "monitoring" material, and the wearing strip, the "monitored" material.

A tube of circular cross-section will be flush-fitted into a groove of which a portion is semi-circular, such as for example that shown in FIG. 4. In this case, a glue seal (11) is used to render the tube rigid with the groove.

It is also possible to assemble the tube and the groove by using an adhesive (10) in order to glue the tube into the groove, as shown in FIG. 3. Preferably, the adhesive is of the type which hardens by polymerization in an oven (a thermo-hardening adhesive) so that the layer of adhesive transmits faults or stresses in the "monitored" material to the "monitoring" material with the greatest possible sensitivity. Elastomer or thermoplastics based adhesives can be used according to the invention, but they are not preferred because they less readily propagate the stresses than do the harder or more resilient adhesives.

Among the thermo-hardening adhesives, it is possible to mention those which are phenolic resin or epoxy resin based.

All these assembly techniques result in a very rigid association of the wearing strip and the detector tube and the applicant has observed that, in this case, there is a ready transmission of stresses from the wearing strip to the detector tube.

Generally, at least one of the ends of the tubes will be fitted with means permitting connection of the tube end to a detection device, the other end being closed. As is already known, the detection device maintains a pressurized fluid in the tube and detects fluctuations in pressure or rate of flow which would result from a leakage due either to normal wear and tear on the friction strip, or the appearance of a defect, such as a split.

The friction strip (1) obtained after assembly of the tube (4) and of the wearing strip (2) is then generally mounted and fixed on a metallic stirrup member (5) for its final use, for example, on a pantograph.

Figure 7:
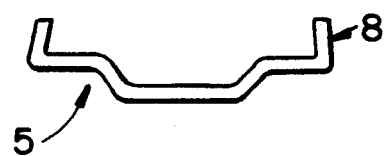
FIG. 7 shows a non-self-supporting stirrup member which may be used in accordance with the invention.

The stirrup member (5), as shown in FIG. 2, is of the "self-supporting" type. It is also possible to use a stirrup member which is not self-supporting and which may in cross-section be of the shape shown in FIG. 7.

As already mentioned, the main advantage of the invention is the great sensitivity with which faults are detected. Although this property cannot be readily quantified, the applicant has observed that the wearing strip of the friction strip according to the invention did not suffer any damage, for example a split caused by a shock, without the tube being likewise damaged and split. This is the result of the concept developed within the invention, in other words, the use of two materials, a "monitored" material and a "monitoring" material, which have closely related properties, such as mechanical strength and resilience, particularly, and their association by flush fitment or with the help of an adhesive does not substantially impair propagation of damage from the wearing strip (2) to the detector tube (4).

The other advantages of the friction strip according to the invention likewise result from the similarity in behavior of the "monitoring" and "monitored" materials and they are the following:

a good resistance of the friction strip to heat related attack: in service or during production of the strip, temperatures which may range from $-30°$ to $+200°$ are frequent. These fluctuations in temperature have no harmful influence on the friction strip according to the invention, of which the two main constituents, the wearing strip and the detector tube, have substantially the same expansion characteristics;

a good resistance in a period of time and good resistance to fatigue taking into account the carbon-based nature of the materials. Furthermore, the evolution of the characteristics is the same in course of time for both the "monitoring" and the "monitored" materials;

good resistance of the materials used according to the invention to chemical or photochemical attack (such as the ultraviolet rays of the sun), and good resistance to corrosion, particularly electrochemical corrosion in the presence of moisture and to the passage of electric current. All these properties and all these advantages demonstrate the interest of the invention in contributing to safety, regularity and viability of everyday transport means, and particularly that of high speed trains.

EXAMPLE

As a first step, an amorphous carbon wearing strip (reference AR 129 of the Societe Le Carbone Lorraine) was produced from mixtures of powdered coke, graphite and pitch. This mixture was compressed to form a cylindrical "ball" of 400 mm diameter and with a height of 1000 mm. This "ball" was extruded producing a profiled section having substantially the largest cross-section of the finished wearing strip. It was cut into bars of equal length which were fired in an oven at a temperature of around 1300°.

After firing, the profiled section was cut to the length of the final wearing strip (696 mm) and it was grooved by machining. It is likewise possible to obtain a groove by a drawing or extrusion process, but in this case, there are risks of the material bursting when fired due to distortions introduced by the groove. The part of the profiled section intended to be in contact with the jaws (8) of the stirrup member was then coppered and tinned, this part corresponding to the zone of the lateral constrictions (6) having been coppered and tinned by masking the part not intended to be coppered and tinned.

A leak-proof carbon tube was then produced. A ball constituted by powders and binders close in their nature to those used for the wearing strip, but in the case of the powders, of smaller granulation in order to obtain a final tube of considerable resistance to leaks was extruded. A profiled section tube was produced which was cut to the length of 1500 mm in order to be fired. The profiled section tube was fired at around 1300° C.

In order to ensure considerable resistance to leaks, the profiled tube was impregnated with a thermosetting resin, for example a phenolic resin, which was polymerized at 200° for a few hours (the resultant material corresponds to reference JP 445 of the Societe Le Carbone Lorraine).

Figure 8:
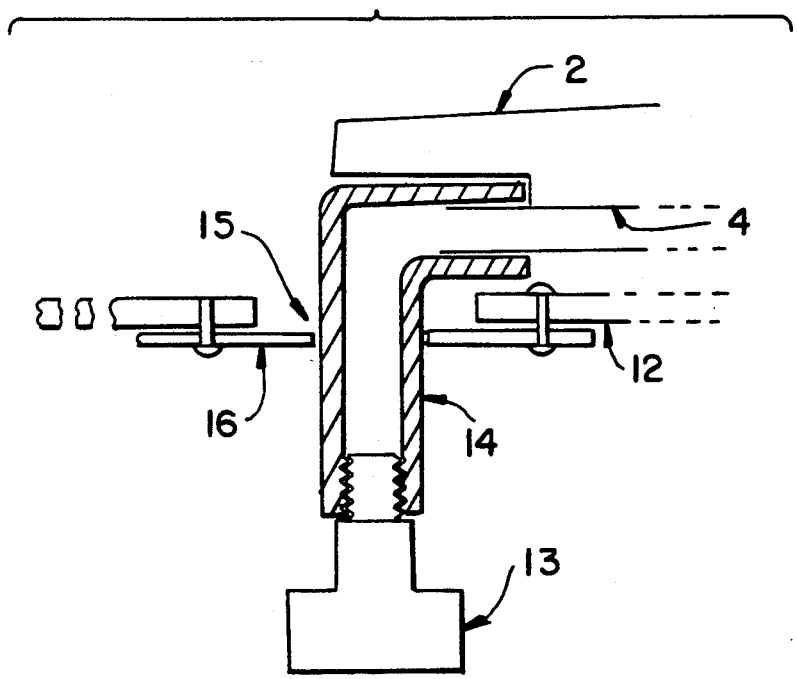
FIG. 8 shows in longitudinal section an example of connection of the tube (4) rigid with the wearing strip (2), to the detection device (13) not shown, using an elbow-shaped socket (14).

Each end of the tube was then connected to an aluminum elbow-shaped socket (14), as shown in FIG. 8, by flush fitment and gluing of the end of the tube into one of the orifices of the elbow-shaped socket, the other orifice of the elbow-shaped socket being provided with an internal thread for connection to the detection system (13) while having on the outside a square cross-section in order to allow the socket, once it has been positioned on the stirrup member, to be rotationally locked. A first sealing test was conducted at 1.5 MPa: no bubbles appeared under this pressure.

The tube provided with its elbow-shaped sockets and the wearing strip was then assembled by introducing an adhesive consisting of a graphite powder filled phenolic resin into the groove in the wearing strip and by then applying the tube in such a way that the tube is in the bottom of the groove, in contact with the wearing strip, the two elbow-shaped sockets emerging at right-angles to the base of the wearing strip. The phenolic resin was polymerized at around 80° C.

Thus, a friction strip was obtained which comprised a wearing strip rigid with a detector tube provided with sockets for a leak-proof connection to a leakage detection system.

Then, the friction strip and the stirrup member were assembled by snap-fitment of the friction strip into the stirrup member by virtue of the elasticity of the edges of the stirrup member. Previously, orifices (15) were cut into the ends of the plate (12) of the stirrup member (5) and they were sufficiently wide to allow passage of the sockets (14), threaded on the inside and of an external square cross-section. On each socket of square cross-section was slid a plate (16) with a square hole of substantially the same square outer cross-section as the socket with a slight clearance allowing sliding and it was fixed to the stirrup member, for example by means of rivets in order to rotationally lock the threaded socket (14) and allow a tightly sealed connection to the detection device (13).

There followed a soldering of the friction strip and of the stirrup member which had been tinned prior to being assembled together with the friction strip.

The upper part of the friction strip was then machined in such a way as to provide a three-face friction surface, with a central plane parallel with the base of the friction strip and with two slightly inclined lateral faces.

The friction strip was then treated with paraffin to make it impermeable to water and then, under the same conditions as previously, the tightness of the tube was checked for leakage.

| Properties of the Materials Used | | |
| --- | --- | --- |
| | Strip AR 129 | Tube ref. JP 445 |
| Resistance to flexing | 370 daN/sq. cm | 320 daN/sq. cm |
| Shore hardness | 85 | 80 |
| Density | 1.7 | 1.9 |
| Thermal resistance | Very good | Very good |
| Resistance to UV rays | Very good | Very good |
| Expansion | Identical in both cases | |

Test Conducted on the Friction Strip

Pressure resistance test: the working pressure being 1 MPa, the test pressure is 1.5 MPa (conventional hydraulic test) for a period of 1 to 6 hours. During the course of this test, no rupture or loss of pressure was found even with thermal cycles from −30° C. to +200° C., the range of temperature to which the friction strip may be exposed during operation.

Damage detection sensitivity test: a wearing strip provided with its detector tube is subjected to an impact resistance test (the mass being released from a certain height and striking the wearing strip-Charpy drop tester type). It was observed that there was simultaneity between appearance of the split in the wearing strip and detection of the fault.

Thermal resistance test: the friction strip is subjected to 100 temperature cycles ranging from −30° C. to +200° C. No change in performance was observed after these 100 cycles.

Test to establish the wearing limit being exceeded: on a test bench, a friction strip was set up and operating conditions were simulated (speed, bearing force, sweeping of the overhead contact wire). It was observed that the detector tube did not in any way change the pick-up performance and that when the overhead contact wire comes in contact with the tube and punctures it, the tube starts to leak and therefore detection takes place without either crushing or rupturing of the tube, nor any even partial bursting of the wearing strip. Therefore, detection takes place prior to any damage to the overhead contact wire or to the stirrup member.

Fatigue resistance test: in normal operation, the friction strip may be subjected to flexing, mainly in a vertical direction. The friction strip was subjected to an alternating flexing by applying an alternating stress to the center of the strip, the two ends of which resting on supports. Flexing produced a sag the amplitude of which ranged from 0.5 to 1 mm. The appearance and propagation of a split (detected by the tube) was observed either to have a sag of greater amplitude than 1 mm or beyond $10^6$ cycles. This test demonstrates the good resistance of the friction strip to fatigue and confirms the damage detection sensitivity.

A comparative test conducted with the same wearing strip, but using a tube of silicone rubber glued with an adhesive of the same chemical type as in the prior art (GB 1 374 972) confirmed the many advantages of the invention, particularly to the damage detection sensitivity.

I claim:

1. A friction strip for cooperation with a damage detection device, to be used for the transfer of electrical energy from a wire to rolling stock comprising:
    a wearing portion made of a carbon based electrically conductive non-porous composition having predetermined thermo-mechanical characteristics such as strength and expansion coefficient,
    a stirrup member for supporting said wearing portion,
    a leakproof tube made of a carbon-based material having substantially identical thermo-mechanical characteristics as the wearing portion, said tube having one closed end,
    said wearing portion having a first surface for the transfer of electrical energy and a second surface, a substantially rectangular groove machined into said second surface, along the length of the wearing portion,
    said leakproof tube being inserted into said groove,
    means for rigidly supporting the tube in said groove,
    means for applying pressurized fluid to a second end of said tube, and means for detecting pressure restriction resulting from damage to the tube,
    wherein damage to the tube resulting from wear of the wearing portion is detected before the end of the useful life is reached.

2. A friction strip according to claim 1, wherein the wearing portion has restrictions on both sides, the stirrup member has jaws and the height of the restrictions is at least equal to the height of the jaws, the depth of the groove is greater than the height of the jaws, so that when the wearing portion is worn, the wire reaches the groove, damaging the tube and triggering a signal.

3. A friction strip according to claim 2 in which the carbon based material constituting the tube (4) has a resistance to wear which is at most equal to that of the carbon based material used for the wearing strip (2).

4. A friction strip according to claim 3 in which said means for rigidly supporting the tube is a thermo-hardening resin based adhesive.

5. A friction strip according to claim 4 in which the thermo-hardening resin based adhesive contains a resin chosen from among the phenolic resins and epoxy resins.

6. A friction strip according to claim 3 in which the means for rigidly supporting the tube (4) is a thermo-hardening adhesive applied following a flush fitment of the tube in the wearing strip groove.

7. A friction strip according to claim 6 in which the tube (4) is cylindrical, in which the groove (2) in the wearing strip comprises a semi-cylindrical portion, in which the tube is flush fitted and in which the tube is maintained flush fitted by an adhesive seal.

8. A method of producing a friction strip (1) of carbon based material rigid with a stirrup member (5) having a jaw (8) and a length comprising a wearing strip (2) provided with a groove (3) containing a leakproof tube (4) connected to a leakage detection system (13) in order to detect damage to the friction strip, comprising the following steps:
 a) producing a wearing strip (2) from carbon based material
 b) machining a groove (3) in the bottom part of the wearing strip, the depth of the groove being at least equal to the height of the jaw (8) of the stirrup member (5), the length of the groove being close to that of the wearing strip;
 c) producing a tube (4) of carbon based material which is leakproof at a pressure of at least 1 MPa, the tube dimensions being close to those of the groove and with at least one of the tube ends having fixed a metallic socket (14) permitting of connection to a leakage detection system (13);
 d) assembling the friction strip (1) by introducing the tube (4) into the groove (3) of the wearing strip (2), and forming a rigid connection therebetween;
 e) snap-fitting the assembled friction strip into the stirrup member by virtue of the flexibility of the jaws (8) of the stirrup member and welding at least parts of the jaws (8) to parts of the friction strip;
 f) establishing a leakproof connection between the detection device (13) and the metallic socket (14) without exerting any significant mechanical stresses on the tube (4).

9. A method according to claim 8 in which the forming a rigid connection of the wearing strip (2) and the tube (4) is accomplished by using a thermo-hardening adhesive, with a powdered graphite filler.

10. A method according to claims 9 or 8 in which the step of establishing a leakproof connection to the detection device without exerting mechanical stresses on the tube (4) comprise the use of a socket (14) of non-circular cross-section and a plate (16) provided with an orifice having substantially the same non-circular cross-section through which passes the socket (14), the plate (16) being fixed to the base (12) of the stirrup member (5) in such a way as to arrest rotation of the socket (14).

* * * * *